US011520855B2

(12) United States Patent
Horesh et al.

(10) Patent No.: US 11,520,855 B2
(45) Date of Patent: Dec. 6, 2022

(54) MATRIX SKETCHING USING ANALOG CROSSBAR ARCHITECTURES

(71) Applicants: INTERNATIONAL BUSINESS MACHINES CORPORATION, Armonk, NY (US); Ramot at Tel-Aviv University Ltd., Tel Aviv (IL)

(72) Inventors: Lior Horesh, North Salem, NY (US); Oguzhan Murat Onen, Boston, MA (US); Haim Avron, Tel-Aviv (IL); Tayfun Gokmen, Briarcliff Manor, NY (US); Vasileios Kalantzis, White Plains, NY (US); Shashanka Ubaru, Ossining, NY (US)

(73) Assignees: INTERNATIONAL BUSINESS MACHINES CORPORTATION, Armonk, NY (US); RAMOT AT TEL-AVIV UNIVERSITY, LTD., Tel Aviv (IL)

( * ) Notice: Subject to any disclaimer, the term of this patent is extended or adjusted under 35 U.S.C. 154(b) by 278 days.

(21) Appl. No.: 16/874,819

(22) Filed: May 15, 2020

(65) Prior Publication Data
US 2021/0357540 A1 Nov. 18, 2021

(51) Int. Cl.
*G06F 17/16* (2006.01)
*G06N 3/063* (2006.01)
*G06F 17/18* (2006.01)

(52) U.S. Cl.
CPC .......... *G06F 17/16* (2013.01); *G06N 3/0635* (2013.01); *G06F 17/18* (2013.01)

(58) Field of Classification Search
CPC .......... G06F 17/16; G06F 17/18; G06F 30/27; G06F 30/373; G06F 30/392; G06F 2119/06; G06F 2119/12; G06N 3/0635
See application file for complete search history.

(56) References Cited

U.S. PATENT DOCUMENTS

| 5,548,798 A | 8/1996 | King |
| 9,524,775 B1 | 12/2016 | Papandreou et al. |

(Continued)

FOREIGN PATENT DOCUMENTS

| CN | 105160664 A | 12/2015 |
| CN | 109522956 A | 3/2019 |

OTHER PUBLICATIONS

Kim, S., et al. "Analog CMOS-based Resistive Processing Unit for Deep Neural Network Training" IEEE 60th Int'l Midwest Symposium on Circuity & Systems, pp. 422-425 (2017) available from <https://ieeexplore.ieee.org/abstract/document/8052950> (Year: 2017).*

(Continued)

*Primary Examiner* — Jay Hann
(74) *Attorney, Agent, or Firm* — Tutunjian & Bitetto, P.C.; Randy Emilio Tejeda (57) ABSTRACT

A computer-implemented method is presented for performing matrix sketching by employing an analog crossbar architecture. The method includes low rank updating a first matrix for a first period of time, copying the first matrix into a dynamic correction computing device, switching to a second matrix to low rank update the second matrix for a second period of time, as the second matrix is low rank updated, feeding the first matrix with first stochastic pulses to reset the first matrix back to a first matrix symmetry point, copying the second matrix into the dynamic correction computing device, switching back to the first matrix to low rank update the first matrix for a third period of time, and as the first matrix is low rank updated, feeding the second matrix with second stochastic pulses to reset the second matrix back to a second matrix symmetry point.

21 Claims, 10 Drawing Sheets

(56) References Cited

U.S. PATENT DOCUMENTS

| | | | |
|---|---|---|---|
| 9,715,655 B2* | 7/2017 | Wu | G06N 3/0635 |
| 10,241,971 B2 | 3/2019 | Muralimanohar | |
| 10,248,907 B2* | 4/2019 | Gokmen | G06N 3/084 |
| 10,325,006 B2 | 6/2019 | Gokmen et al. | |
| 11,106,790 B2* | 8/2021 | Wojnowicz | G06F 17/16 |
| 2004/0193670 A1 | 9/2004 | Langan et al. | |
| 2007/0120872 A1 | 5/2007 | Satoh | |
| 2016/0055124 A1* | 2/2016 | Galvin | G06F 17/16 |
| | | | 708/520 |
| 2018/0046900 A1 | 2/2018 | Dally et al. | |
| 2018/0253642 A1* | 9/2018 | Gokmen | G06N 3/0635 |
| 2019/0005381 A1* | 1/2019 | Li | G06F 17/16 |
| 2019/0080230 A1 | 3/2019 | Hatcher et al. | |
| 2019/0205741 A1 | 7/2019 | Gupta et al. | |
| 2019/0354847 A1 | 11/2019 | Rasch et al. | |
| 2020/0159811 A1* | 5/2020 | Chatterjee | G06F 17/16 |
| 2020/0279169 A1* | 9/2020 | Hoskins | G06F 17/16 |

OTHER PUBLICATIONS

Gokmen, T., et al. "Training Deep Convolutional Neural Networks with Resistive Cross-Point Devices" Frontiers in Neuroscience, vol. 11, article 538 (2017) available from <https://www.frontiersin.org/articles/10.3389/fnins.2017.00538/abstract> (Year: 2017).*

Babu, A. & Rajendran, B. "Stochastic Deep Learning in Memristive Networks" IEEE 24th Int'l Conf. on Electronics Circuits & Systems, pp. 214-217 (2017) available from <https://ieeexplore.ieee.org/abstract/document/8292067> (Year: 2017).*

Gokmen, T. & Vlasov, Y. "Acceleration of Deep Neural Network Training with Resistive Cross-Point Devices: Design Considerations" Frontiers in Neuroscience, vol. 10, article 333 (2016) available from <http://journal.frontiersin.org/article/10.3389/fnins.2016.00333/abstract> (Year: 2016).*

International Search Report issued in corresponding PCT Application Serial No. PCT/IB2021/053027 dated Jun. 24, 2021 (6 pgs).

Getzlaff et al., "A Mixed Signal Multiplier Principle for Massively Parallel Analog VLSI Systems", Proceedings of the 3rd IMACS International Multiconference on Circuits, Systems, Communications and Computers. Jul. 1999, Athens, Greece. (pp. 1-6.).

Lee et al., "Matrix Mapping on Crossbar Memory Arrays with Resistive Interconnects and Its Use in In-Memory Compression of Biosignals", Micromachines 2019. vol. 10, No. 306. May 7, 2019. (pp. 1-8.).

Mell et al., "The NIST Definition of Cloud Computing", NIST Special Publication 800-145. Sep. 2011. (pp. 1-7.).

* cited by examiner

MATRIX SKETCHING USING ANALOG CROSSBAR ARCHITECTURES

BACKGROUND

The present invention relates generally to streaming algorithms, and more specifically, to matrix sketching using analog crossbar architectures.

Deep neural networks (DNN) have made tremendous advances, in some cases surpassing human level performance, tackling challenging problems such as speech recognition, natural language processing, image classification, and machine translation. Training of large DNNs, however, is a time consuming and computationally intensive task that demands datacenter scale computational resources composed of state of the art graphical processing units (GPUs). There have been attempts to accelerate deep learning workloads beyond GPUs by designing custom hardware utilizing reduced precision arithmetic to improve throughput and energy efficiency of the underlying complementary metal oxide semiconductor (CMOS) technology. Alternative to digital approaches, resistive cross-point device arrays have been proposed to further increase the throughput and energy efficiency of the overall system by performing vector-matrix multiplications in the analog domain.

SUMMARY

In accordance with an embodiment, a method is provided for performing matrix sketching by employing an analog crossbar architecture. The method includes updating a first matrix for a first period of time, copying the first matrix into a dynamic correction computing device, switching to a second matrix to update the second matrix for a second period of time, as the second matrix is low rank updated, feeding the first matrix with first stochastic pulses to reset the first matrix back to a first matrix symmetry point, copying the second matrix into the dynamic correction computing device, switching back to the first matrix to update the first matrix for a third period of time, and as the first matrix is low rank updated, feeding the second matrix with second stochastic pulses to reset the second matrix back to a second matrix symmetry point. The updates are low-rank updates.

In accordance with another embodiment, a system is provided for performing matrix sketching by employing an analog crossbar architecture. The system includes a memory and one or more processors in communication with the memory configured to update a first matrix for a first period of time, copy the first matrix into a dynamic correction computing device, switch to a second matrix to update the second matrix for a second period of time, as the second matrix is low rank updated, feed the first matrix with first stochastic pulses to reset the first matrix back to a first matrix symmetry point, copy the second matrix into the dynamic correction computing device, switch back to the first matrix to update the first matrix for a third period of time, and as the first matrix is low rank updated, feed the second matrix with second stochastic pulses to reset the second matrix back to a second matrix symmetry point. The updates are low-rank updates.

In accordance with yet another embodiment, a non-transitory computer-readable storage medium comprising a computer-readable program for performing matrix sketching by employing an analog crossbar architecture is presented. The non-transitory computer-readable storage medium performs the steps of updating a first matrix for a first period of time, copying the first matrix into a dynamic correction computing device, switching to a second matrix to update the second matrix for a second period of time, as the second matrix is low rank updated, feeding the first matrix with first stochastic pulses to reset the first matrix back to a first matrix symmetry point, copying the second matrix into the dynamic correction computing device, switching back to the first matrix to update the first matrix for a third period of time, and as the first matrix is low rank updated, feeding the second matrix with second stochastic pulses to reset the second matrix back to a second matrix symmetry point. The updates are low-rank updates.

In accordance with an embodiment, a method is provided for performing matrix sketching by employing an analog crossbar architecture. The method includes applying dimensionality reduction to streaming data using outer product updates, and once the dimensionality reduction is applied to an entire input, moving a sketched matrix to a digital computer to perform regression analysis. The updates are low-rank updates.

In accordance with another embodiment, a system is provided for performing matrix sketching by employing an analog crossbar architecture. The system includes a memory and one or more processors in communication with the memory configured to apply dimensionality reduction to streaming data using outer product updates, and once the dimensionality reduction is applied to an entire input, move a sketched matrix to a digital computer to perform regression analysis. The updates are low-rank updates.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE DRAWINGS

The invention will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for performing matrix sketching by using analog crossbar architectures. Due to recent advances in data collection techniques, massive amounts of data are being collected at an extremely fast pace. Also, these data are potentially unbounded. Boundless streams of data collected from sensors, equipment, and other data sources are referred to as data streams. Various data mining tasks can be performed on data streams in search of interesting patterns. Data mining tasks usually involve employing data streaming algorithms.

Streaming algorithms are able to process an extremely large, even unbounded, data set and compute some desired output using only a constant amount of random access memory (RAM). If the data set is unbounded, it is referred to as a data stream. In such a case, if processing of the data stream is stopped at some position n, the streaming algorithm has a solution corresponding to the data seen up to that point. Therefore, streaming algorithms are algorithms for processing data streams in which the input is presented as a sequence of items and can be examined in only a few passes (usually just one). In most models, these algorithms have access to limited memory. They can also have limited processing time per item. These constraints can mean that an algorithm produces an approximate answer based on a summary or "sketch" of the data stream.

The exemplary embodiments of the present invention employ streaming algorithm based matrix sketching by using analog crossbar architectures. A final sketching matrix is placed in analog crossbar hardware. The outer product of the final sketching matrix is changed with application of stochastic pulses. Once the sketching procedure is applied to the entire input, the final sketched matrix is moved to a digital computer to perform regression analysis.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
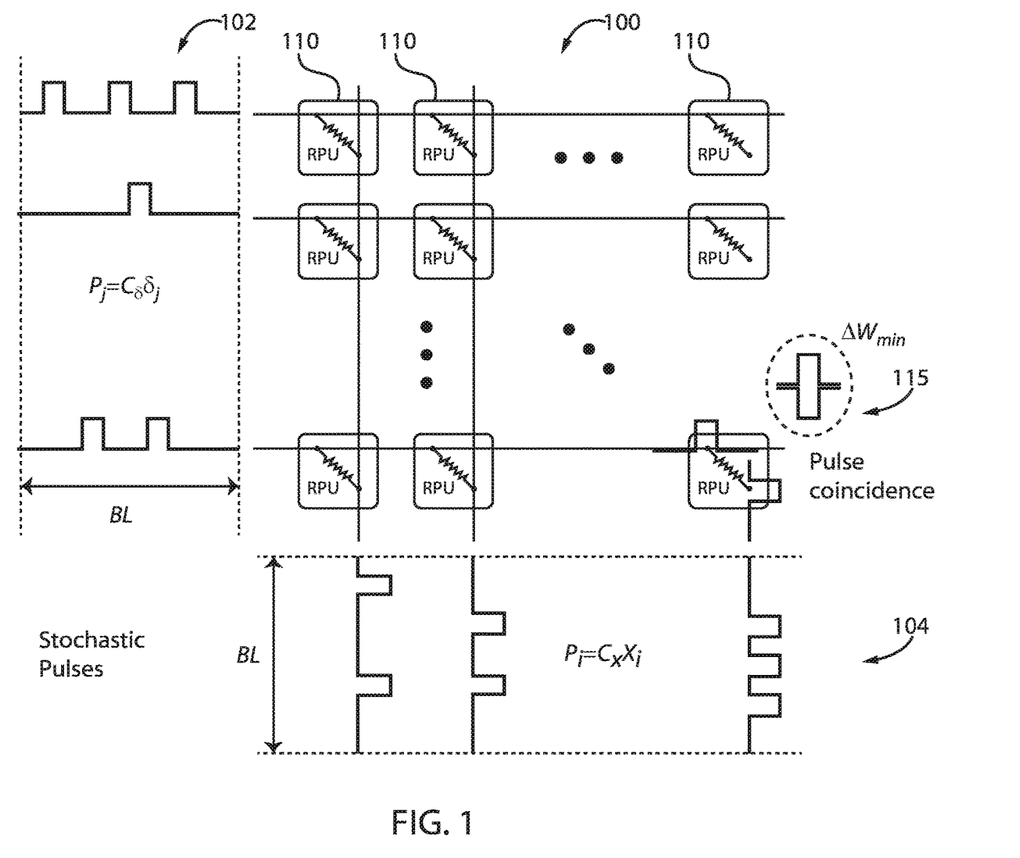
FIG. 1 is an exemplary analog crossbar architecture employing sketching matrices, in accordance with an embodiment of the present invention.

FIG. 1 is an exemplary analog crossbar architecture employing sketching matrices, in accordance with an embodiment of the present invention.

The analog crossbar array 100 includes a plurality of sketching resistive processing units (RPUs) 110 arranged in a matrix configuration. The outer product is changed by applying stochastic pulses 102, 104. The outer product is changed to implicitly compute and update the rank one updates. At the end of the operation, the final sketching matrix exists in the analog domain. The solving part can be performed either in analog or in digital domain. The pulses reduce the multiplication to a simple coincidence detection 115 that can be realized by the RPU devices 110.

In the stochastic update scheme, numbers that are encoded from the columns and rows ($x_i$ and $\delta_j$) are translated to stochastic bit streams using stochastic translators. These stochastic translators adjust the pulse probabilities at the periphery, and hence they control the total number of the pulse coincidences happening at each crossbar element. In this scheme, these pulses are sent into the crossbar array simultaneously for all rows and all columns, and then for each coincidence event the corresponding RPU device changes its conductance by a small amount $\Delta g_{min}$. However, there exist many pulses in the pulse stream so that the total conductance change $\Delta g_{total,ij}$ required by the algorithm is implemented as series of small conductance changes $\Delta g_{min}$ per pulse coincidence. As a result, the weight update happens as a series of coincidence events each triggering a conductance increment (or decrement). $\Delta w_{min}$ is the expected weight change due to a single coincidence event. It is noted that the pulses generated at the peripheral are applied to all RPU devices among the column (or the row), and therefore stochastic translators can assume a single $\Delta g_{min}$ (or equivalently $\Delta w_{min}$) value for the whole array when the pulse probabilities are calculated to result in the desired weight change at each RPU.

Figure 2:
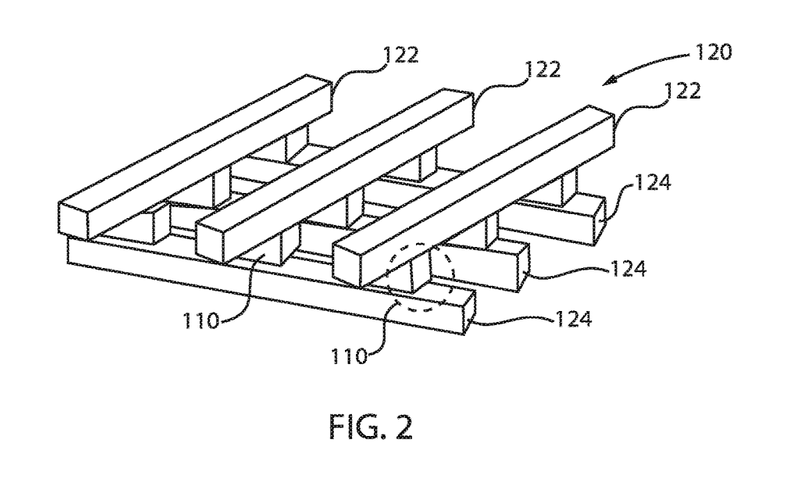
FIG. 2 is an exemplary 3D crossbar array incorporating the sketching matrices of FIG. 1, in accordance with an embodiment of the present invention.

FIG. 2 is an exemplary 3D crossbar array incorporating the sketching matrices of FIG. 1, in accordance with an embodiment of the present invention.

In various example embodiments, the sketching matrix 110 represents a memory cell incorporated between a plurality of bit lines 122 and a plurality of word lines 124. Thus, the array 120 is obtained by perpendicular conductive wordlines (rows) 124 and bitlines (columns) 122, where a sketching matrix 110 exists at the intersection between each row and column. The sketching matrix 110 with resistive memory element can be accessed for read and write by biasing the corresponding wordline 124 and bitline 122.

Figure 3:
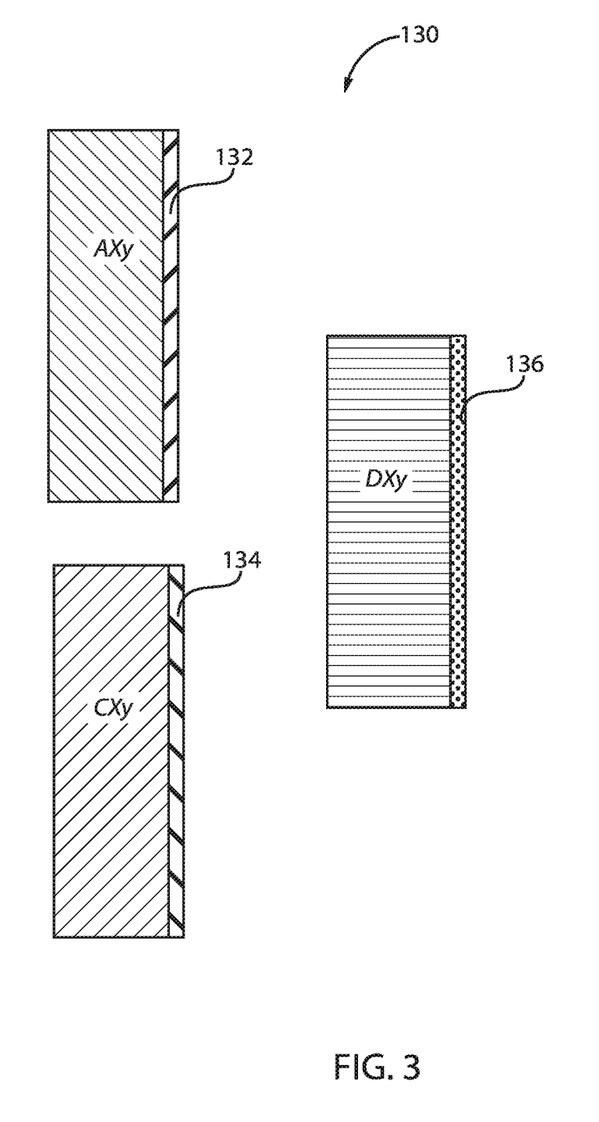
FIG. 3 is an exemplary system for analog streaming with dynamic computation, in accordance with an embodiment of the present invention.

FIG. 3 is an exemplary system for analog streaming with dynamic computation, in accordance with an embodiment of the present invention.

The system 130 includes a first matrix 132 and a second matrix 134. The first and second matrices 132, 134 communicate with a dynamic correction computing device 136.

The first matrix 132 is updated for a first period of time, $\tau_1$. After the first matrix 132 is updated, it is copied to the dynamic correction computing device 136. The updating function is then switched to the second matrix 134 for a second period of time, $\tau_2$. As the second matrix 134 is being updated, the first matrix 132 is fed with stochastic pulses to reset the first matrix 132 back to a symmetry point. The second matrix 134 is then copied to the dynamic correction computing device 136. The updating is switched back to the first matrix 132 for a third period of time, $\tau_3$. As the first matrix 132 is being updated again, the second matrix 134 is fed with stochastic pulses to reset the second matrix 134 back to a symmetry point. This process is repeated until a final sketching matrix SXy is obtained.

The utilization of the second array 134 enables continuous operation at the expense of the additional architecture. The streaming data (X, y) should be normalized to avoid further enhancing the asymmetry effect. Furthermore, the updates should be scaled to adjust the final SXy to be between (-0.1, 0.1) for a full range of (-1,1) to operate closer to the symmetry point (0).

In alternative embodiments, if the devices are perfectly symmetric, then the need for the dynamical correction is removed. In those cases, a single array can be used, without any carrying/zeroing operation. Alternatively, zeroing can be skipped, assuming that the random sequence ensures the operation in the vicinity of the symmetry point. In such cases, again a single device can be used in addition to a digital accumulation unit, where the copying operation is handled in small portions (e.g., column by column). All these decisions can be made flexibly depending on the problem and devices at hand flexibly and interchangeably.

The streaming algorithm is an open-loop integration algorithm. Therefore, the dynamical system approach with a secondary array does not ensure the resetting of the first matrix. However, unlike neural networks, these algorithms do not rely on vector-matrix multiplication, therefore the accumulation matrix can reside in digital domain. Thus, instead, two arrays or matrices 132, 134 can be used in parallel in a toggling fashion.

In alternative embodiments, more than 2 matrices can be employed. For example, 3 matrices can be employed. In another example embodiment, 4 matrices can be employed. Of course, one skilled in the art can contemplate a plurality of matrices employed in coordination with the dynamic correction computing device 136. In one instance, a first matrix can be updated for a first period of time, $\tau_1$. After the first matrix is updated, it is copied to the dynamic correction computing device 136. The updating function is then switched to a second matrix for a second period of time, $\tau_2$. As the second matrix is being updated, the first matrix and a third matrix are fed with stochastic pulses to reset the first and third matrices back to their respective symmetry points. The second matrix is then copied to the dynamic correction computing device 136. The updating is switched to the third matrix, where the third matrix can be updated for a third period of time, $\tau_3$. After the third matrix is updated, it is copied to the dynamic correction computing device 136. The updating function is then switched to back to the first matrix for a fourth period of time, $\tau_4$. As the first matrix is being updated, the second and third matrices are fed with stochastic pulses to reset the second and third matrices back to their respective symmetry points. Thus, one matrix can be updated, and two other matrices can be fed with stochastic pulses for resetting to their respective symmetry points. Similarly, one matrix can be updated, and three other matrices can be fed with stochastic pulses for resetting to their respective symmetry points. Thus, a plurality of matrices can be connected to one or more dynamic correction computing device 136 where one matrix is updated as all other matrices are being fed with stochastic pulses for resetting to respective symmetry points. Thus, the exemplary embodiments are not limited to the number of matrices connected to the dynamic correction computing device 136.

Figure 4:
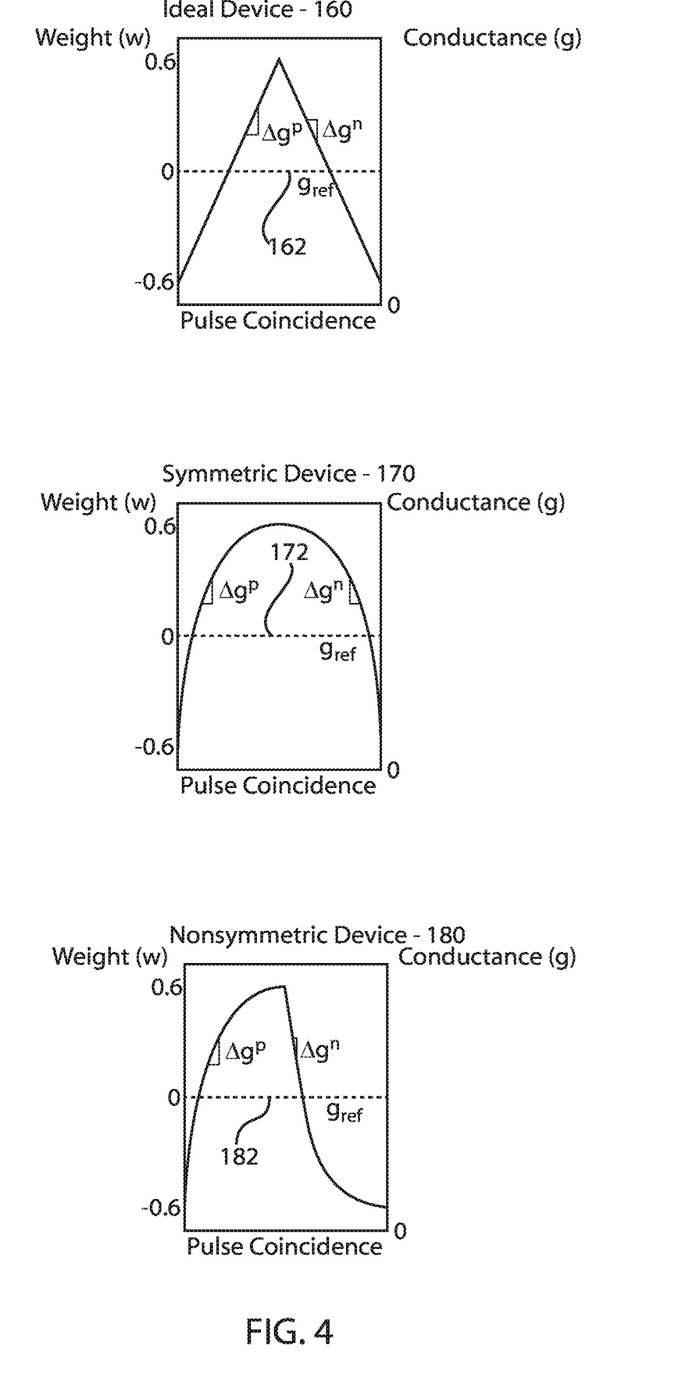
FIG. 4 illustrates exemplary graphs depicting three different device switching characteristics illustrating symmetry points, in accordance with an embodiment of the present invention.

FIG. 4 illustrates exemplary graphs depicting three different device switching characteristics illustrating symmetry points, in accordance with an embodiment of the present invention.

Regarding asymmetric updates, the incremental change the analog devices get when updated is dependent on the weight value which can be represented with a softbound model. This effect creates a bias and significantly impairs the training performance (generation of SXy). For these devices there exists a point where $\Delta w^{increment}(w)=\Delta w^{decrement}(w)$, which is called the symmetry point. A random sequence of equally probable increment and decrement operations would inevitably drive the device state to this symmetry point. This behavior is observed in streaming algorithm as streaming algorithms include a high number of incremental changes. A requirement is that these analog resistive devices must change conductance symmetrically when subjected to positive or negative voltage pulse stimuli.

FIG. 4 depicts three different device switching characteristics. In the ideal device 160, conductance increments and decrements are equal in size and do not depend on device conductance. In the symmetric device 170, conductance increments and decrements are equal in strength, but both have a dependence on device conductance. In the non-symmetric device 180, conductance increments and decrements are not equal in strength and both have different dependencies on device conductance. However, there exists a single point that the strengths of the conductance increment and decrement are equal. This point is called the symmetry point and for the illustrated example matches the reference device conductance and hence happens at w=0. The symmetry point 162 is illustrated in ideal device 160, the symmetry point 172 is illustrated in symmetric device 170, and the symmetry point 182 is illustrated on non-symmetric device 180.

Note that even for the non-symmetric device illustrated in 180 there exists a single point (conductance value) at which the strengths of the conductance increment and decrement are equal. This point is called the symmetry point of the updated device and it can correspond to any weight value (not necessary to zero as illustrated in 180) due to the device-to-device variations.

Figure 5:
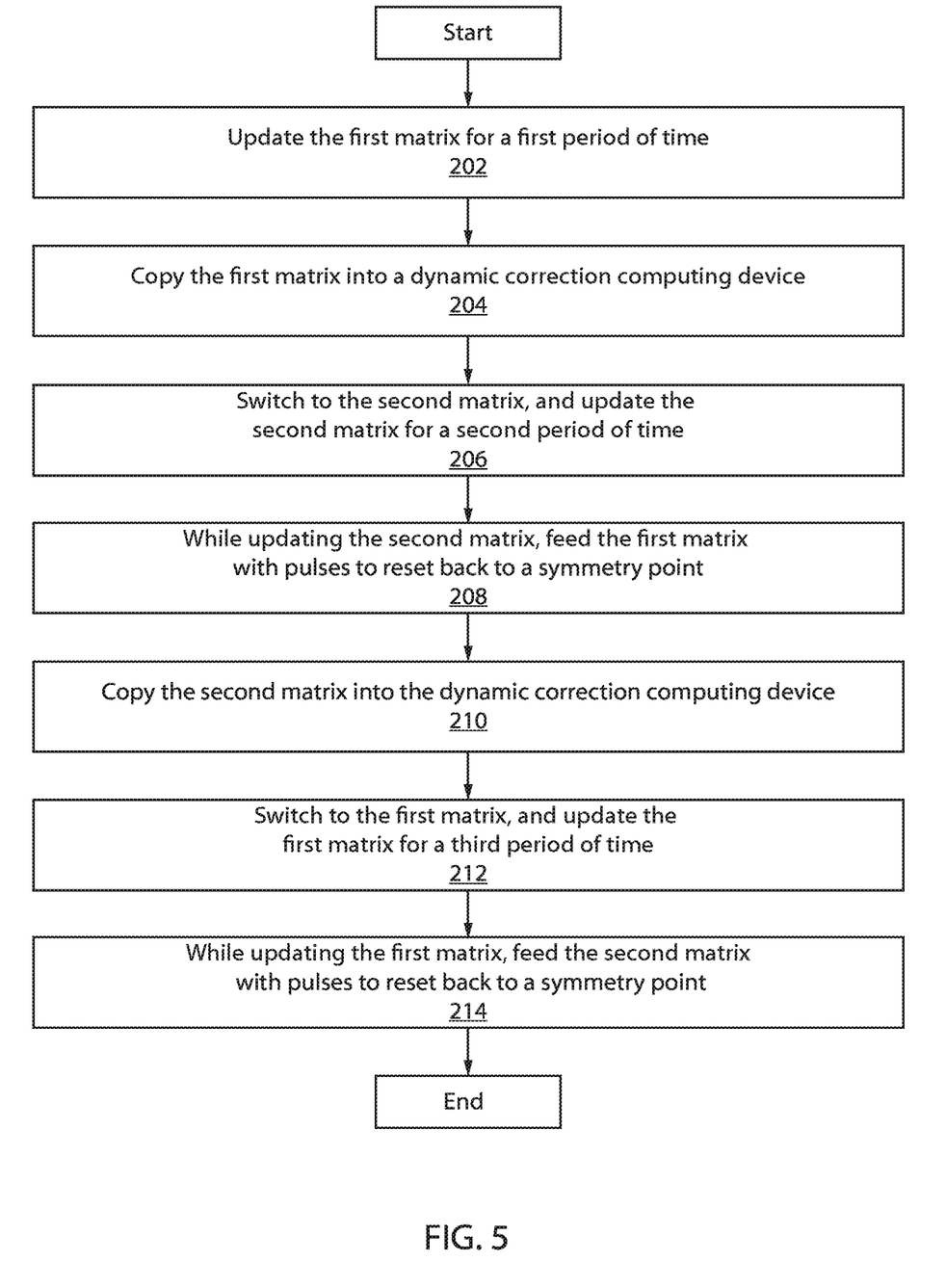
FIG. 5 is a block/flow diagram of an exemplary method for two arrays employed in parallel in an open loop integration scheme, in accordance with an embodiment of the present invention.

FIG. 5 is a block/flow diagram of an exemplary method for two arrays employed in parallel in an open loop integration scheme, in accordance with an embodiment of the present invention.

At block 202, low rank update the $1^{st}$ matrix for a first period of time.

At block 204, copy the $1^{st}$ matrix into a dynamic correction computing device.

At block 206, switch to the $2^{nd}$ matrix, and low rank update the $2^{nd}$ matrix for a second period of time.

At block 208, while (or at the same time, concurrently) low rank updating the $2^{nd}$ matrix, feed the $1^{st}$ matrix with pulses to reset back to a symmetry point.

At block 210, copy the $2^{nd}$ matrix into the dynamic correction computing device.

At block 212, switch to the $1^{st}$ matrix, and low rank update the $1^{st}$ matrix for a third period of time.

At block 214, while (or at the same time, concurrently) low rank updating the $1^{st}$ matrix, feed the $2^{nd}$ matrix with pulses to reset back to a symmetry point.

Figure 6:
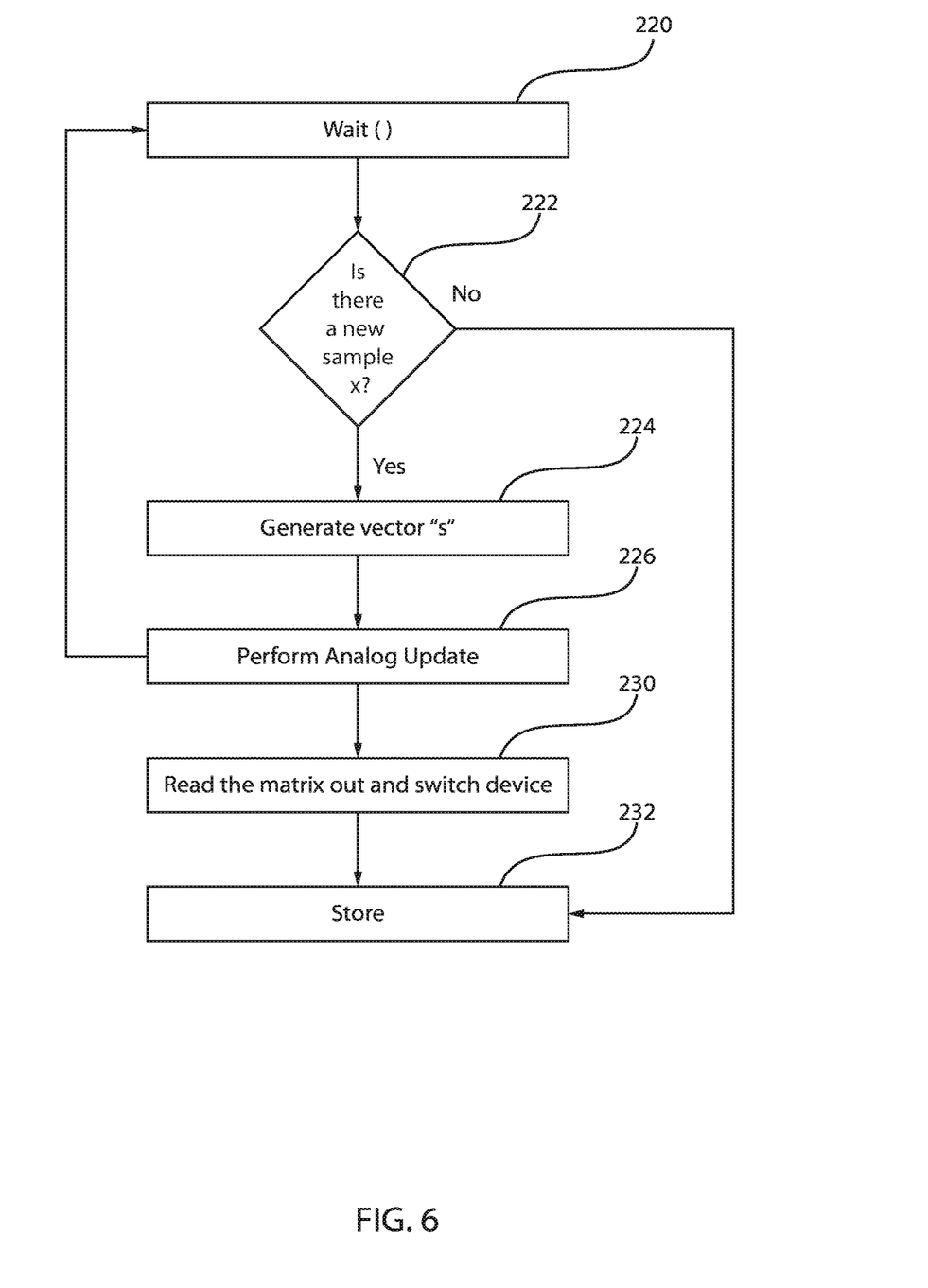
FIG. 6 is a block/flow diagram of an exemplary method for switching between the first and second matrices, in accordance with an embodiment of the present invention.

FIG. 6 is a block/flow diagram of an exemplary method for switching between the first and second matrices, in accordance with an embodiment of the present invention.

At block 220, the method waits.

At block 222, it is determined whether a new sample is received. If NO, the process proceeds to block 230 where the matrix is read out and the device is switched. If YES, the process proceeds to block 224.

At block 224, a vector "s" is generated.

At block 226, an analog low rank update is performed and the process proceeds to block 220.

At block 232, the matrix is stored either in digital form or in a separate analog device.

Figure 7:
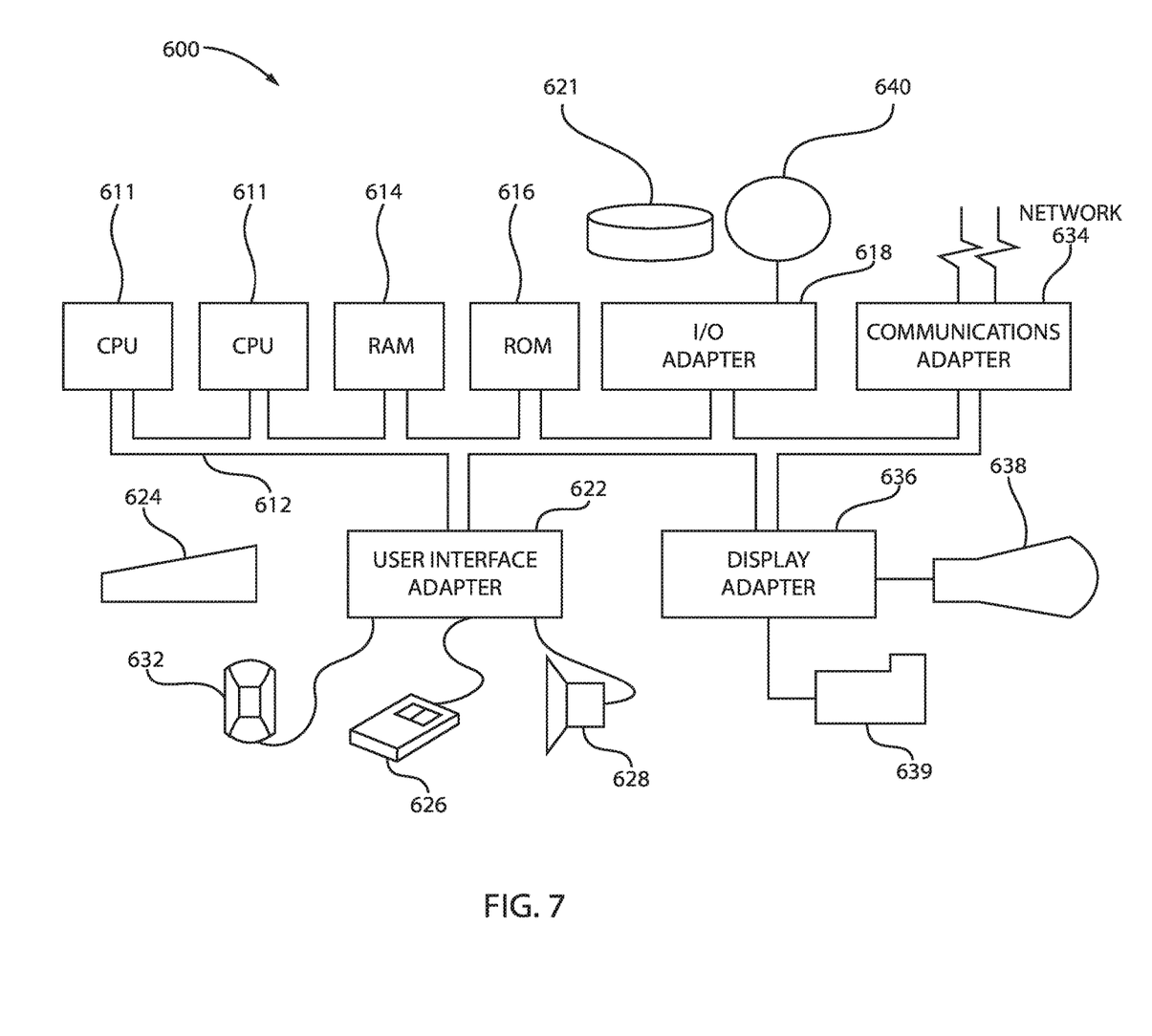
FIG. 7 is an exemplary processing system, in accordance with embodiments of the present invention.

FIG. 7 is an exemplary processing system for handling streaming algorithms, in accordance with embodiments of the present invention.

Referring now to FIG. 7, this figure shows a hardware configuration of computing system 600 according to an embodiment of the present invention. As seen, this hardware configuration has at least one processor or central processing unit (CPU) 611. The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communications adapter 634 for connecting the system 600 to a data processing network, the Internet, an Intranet, a local area network (LAN), etc., and a display adapter 636 for connecting the bus 612 to a display device 638 and/or printer 639 (e.g., a digital printer or the like).

Figure 8:
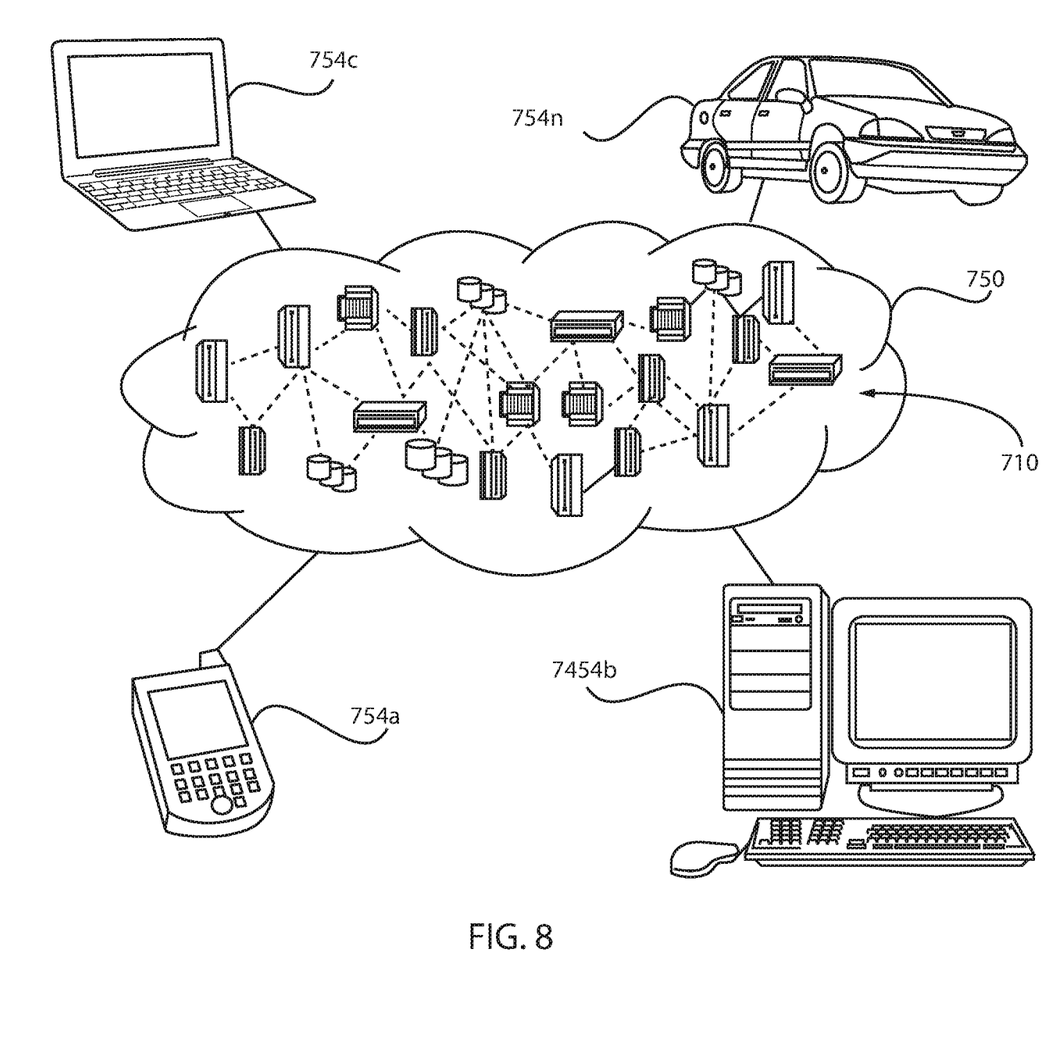
FIG. 8 is a block/flow diagram of an exemplary cloud computing environment, in accordance with an embodiment of the present invention.

FIG. 8 is a block/flow diagram of an exemplary cloud computing environment, in accordance with an embodiment of the present invention.

FIG. 8 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, illustrative cloud computing environment 750 is depicted for enabling use cases of the present invention. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N can communicate. Nodes 710 can communicate with one another. They can be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 8 are intended to be illustrative only and that computing nodes 710 and cloud computing environment 750 can communicate with any type of computerized device over any type of network and/or network addressable connection (e.g., using a web browser).

Figure 9:
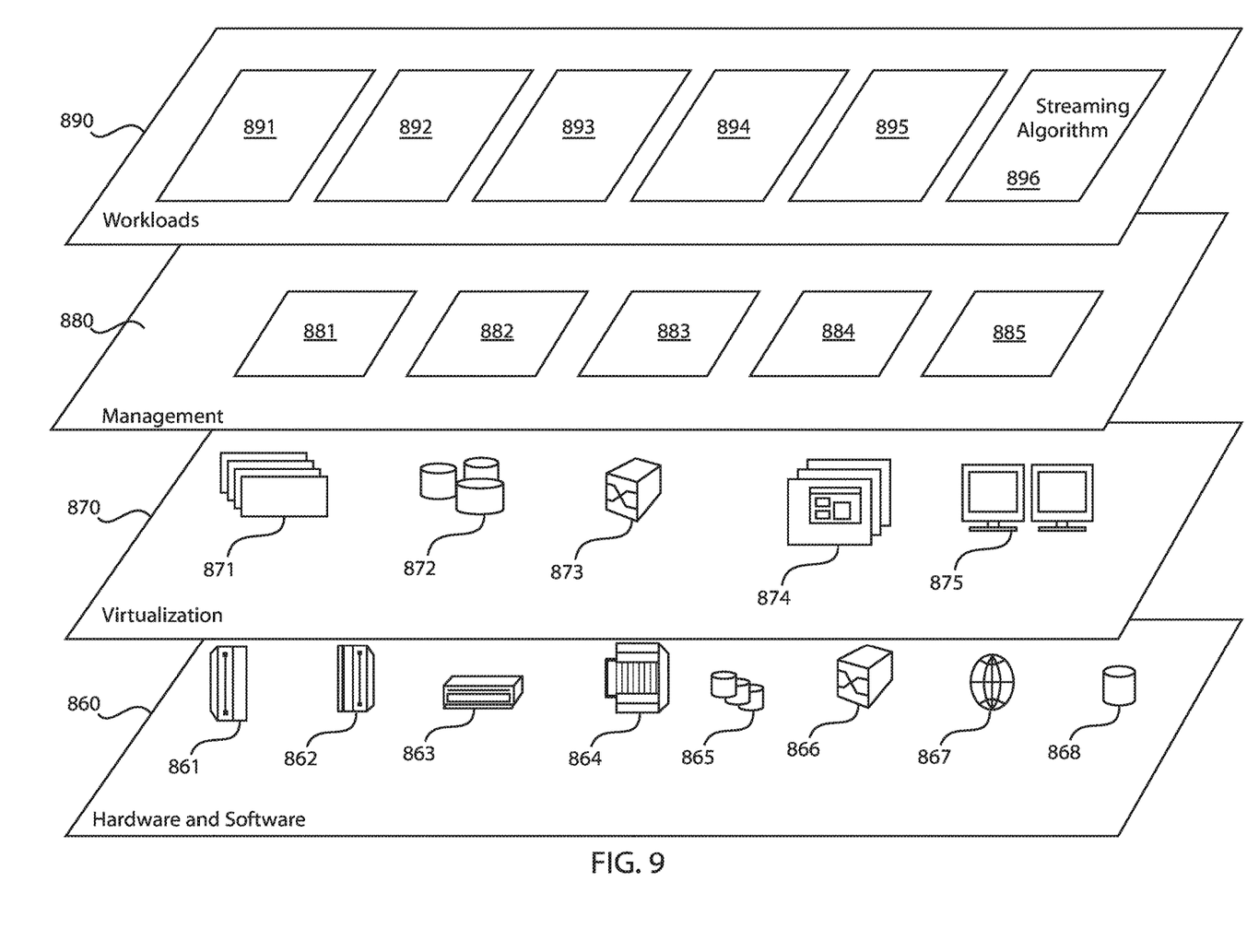
FIG. 9 is a schematic diagram of exemplary abstraction model layers, in accordance with an embodiment of the present invention.

FIG. 9 is a schematic diagram of exemplary abstraction model layers, in accordance with an embodiment of the present invention. It should be understood in advance that the components, layers, and functions shown in FIG. 9 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities can be provided: virtual servers 871; virtual storage 872; virtual networks 873, including virtual private networks; virtual applications and operating systems 874; and virtual clients 875.

In one example, management layer 880 can provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment can be utilized. Examples of workloads and functions which can be provided from this layer include: mapping and navigation 891; software development and lifecycle management 892; virtual classroom education delivery 893; data analytics processing 894; transaction processing 895; and a streaming algorithm 896.

Figure 10:
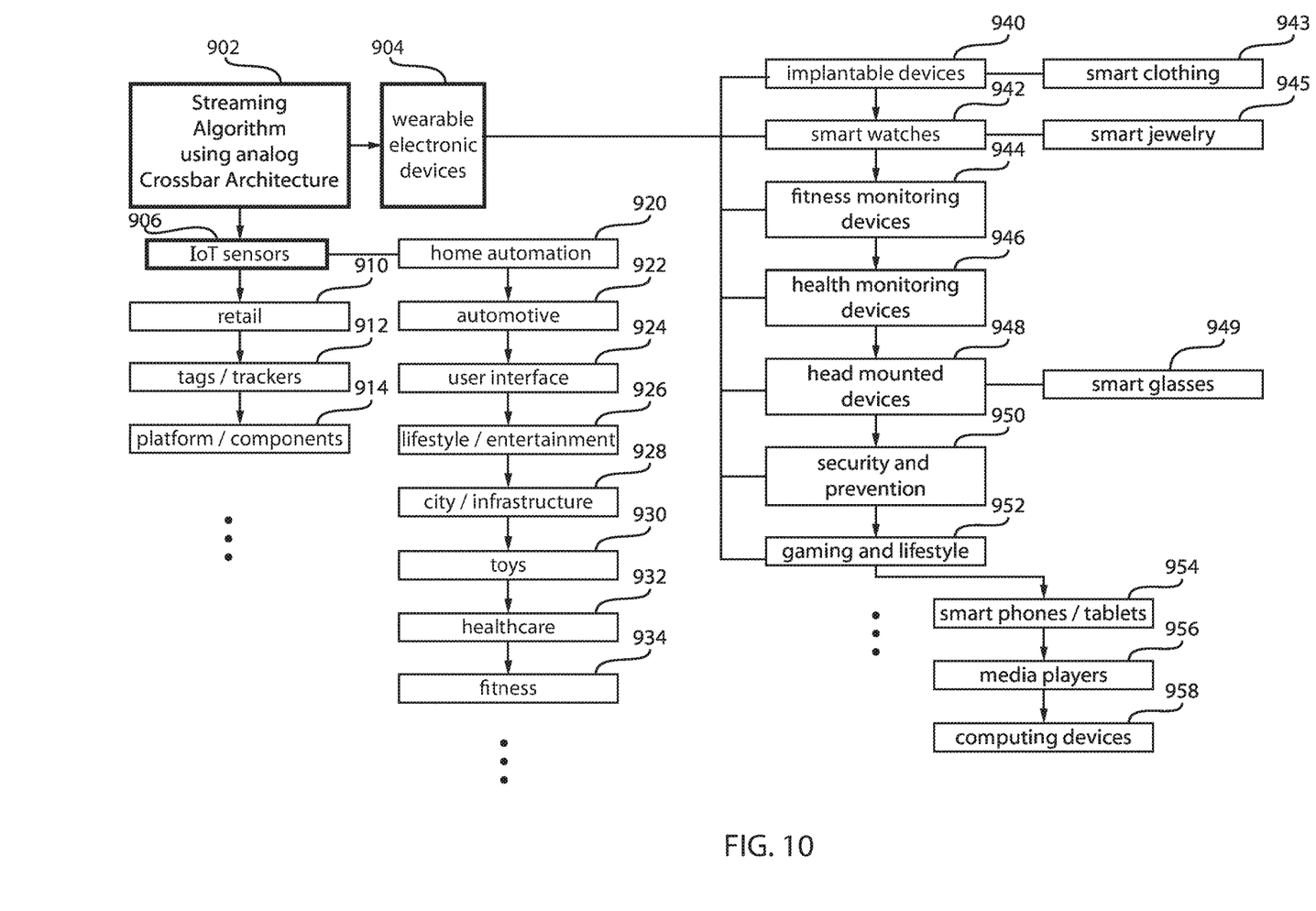
FIG. 10 is a block/flow diagram of a method for applying an open loop integration scheme in Internet of Things (IoT) systems/devices/infrastructure, in accordance with embodiments of the present invention.

FIG. 10 is a block/flow diagram of a method for applying an open loop integration scheme in Internet of Things (IoT) systems/devices/infrastructure, in accordance with embodiments of the present invention.

According to some embodiments of the invention, a network is implemented using an IoT methodology. For example, the streaming algorithm 902 can be incorporated, e.g., into wearable, implantable, or ingestible electronic devices and Internet of Things (IoT) sensors. The wearable, implantable, or ingestible devices can include at least health and wellness monitoring devices, as well as fitness devices. The wearable, implantable, or ingestible devices can further include at least implantable devices, smart watches, head-mounted devices, security and prevention devices, and gaming and lifestyle devices. The IoT sensors can be incorporated into at least home automation applications, automotive applications, user interface applications, lifestyle and/or entertainment applications, city and/or infrastructure applications, toys, healthcare, fitness, retail tags and/or trackers, platforms and components, etc. The streaming algorithm 902 described herein can be incorporated into any type of electronic devices for any type of use or application or operation.

IoT systems allow users to achieve deeper automation, analysis, and integration within a system. IoT improves the reach of these areas and their accuracy. IoT utilizes existing and emerging technology for sensing, networking, and robotics. Features of IoT include artificial intelligence, connectivity, sensors, active engagement, and small device use. In various embodiments, the streaming algorithm 902 of the present invention can be incorporated into a variety of different devices and/or systems. For example, the streaming algorithm 902 can be incorporated into wearable or portable electronic devices 904. Wearable/portable electronic devices 904 can include implantable devices 940, such as smart clothing 943. Wearable/portable devices 904 can include smart watches 942, as well as smart jewelry 945. Wearable/portable devices 904 can further include fitness monitoring devices 944, health and wellness monitoring devices 946, head-mounted devices 948 (e.g., smart glasses 949), security and prevention systems 950, gaming and lifestyle devices 952, smart phones/tablets 954, media players 956, and/or computers/computing devices 958.

The streaming algorithm 902 of the present invention can be further incorporated into Internet of Thing (IoT) sensors 906 for various applications, such as home automation 920, automotive 922, user interface 924, lifestyle and/or entertainment 926, city and/or infrastructure 928, retail 910, tags and/or trackers 912, platform and components 914, toys 930, and/or healthcare 932, as well as fitness 934. The IoT sensors 906 can employ the streaming algorithm 902. Of course, one skilled in the art can contemplate incorporating such streaming algorithm 902 into any type of electronic devices for any types of applications, not limited to the ones described herein.

Figure 11:
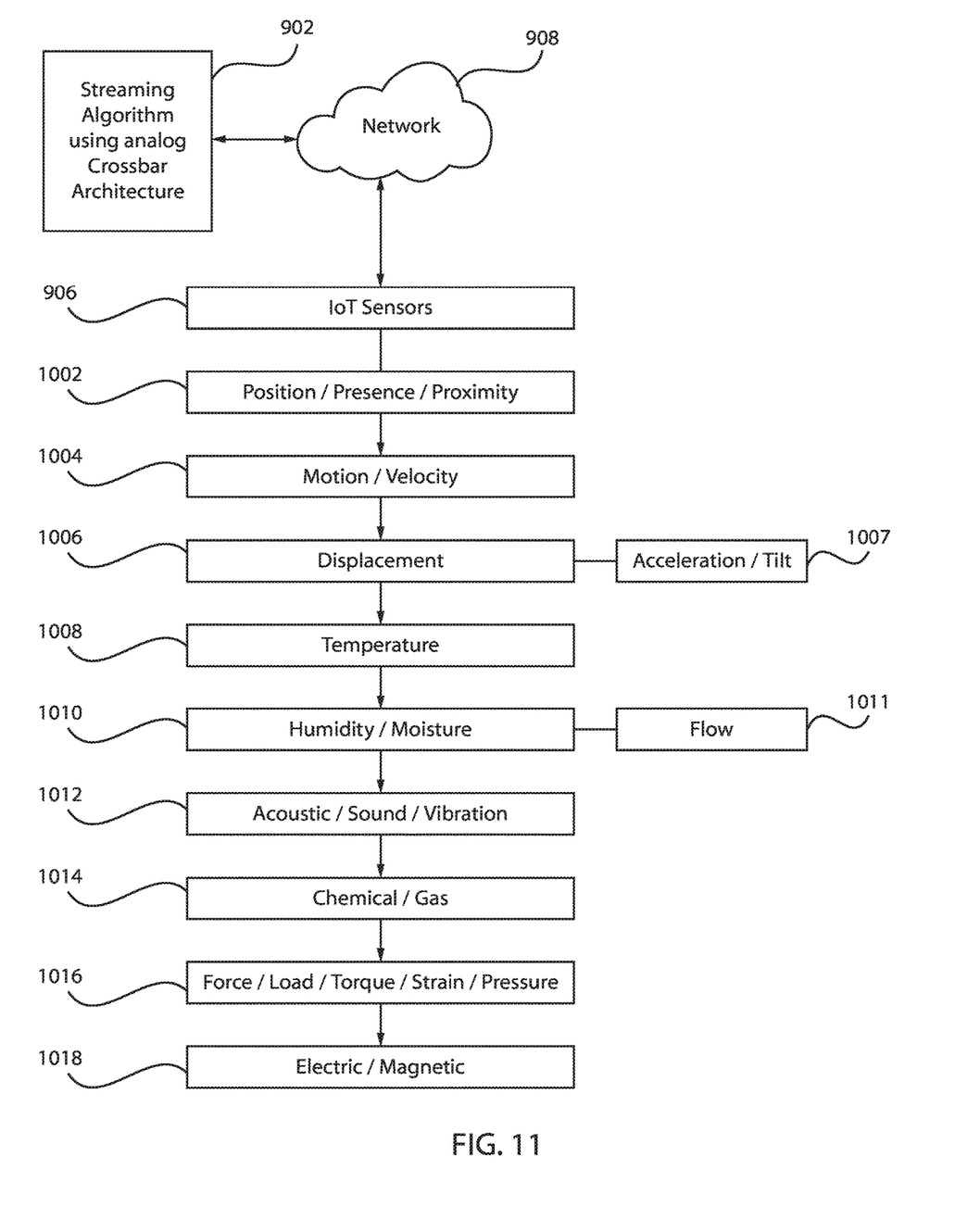
FIG. 11 is a block/flow diagram of exemplary IoT sensors used to collect data/information related to the open loop integration scheme streaming algorithm, in accordance with embodiments of the present invention.

FIG. 11 is a block/flow diagram of exemplary IoT sensors used to collect data/information related to the open loop integration scheme streaming algorithm, in accordance with embodiments of the present invention.

IoT loses its distinction without sensors. IoT sensors act as defining instruments which transform IoT from a standard passive network of devices into an active system capable of real-world integration.

The IoT sensors 906 can employ the streaming algorithm 902 to transmit information/data, continuously and in in real-time, via a network 908, to any type of distributed system. Exemplary IoT sensors 906 can include, but are not limited to, position/presence/proximity sensors 1002, motion/velocity sensors 1004, displacement sensors 1006, such as acceleration/tilt sensors 1007, temperature sensors 1008, humidity/moisture sensors 1010, as well as flow sensors 1011, acoustic/sound/vibration sensors 1012, chemical/gas sensors 1014, force/load/torque/strain/pressure sensors 1016, and/or electric/magnetic sensors 1018. One skilled in the art can contemplate using any combination of such sensors to collect data/information via streaming algorithm 902 of the distributed system for further processing. One skilled in the art can contemplate using other types of IoT sensors, such as, but not limited to, magnetometers, gyroscopes, image sensors, light sensors, radio frequency identification (RFID) sensors, and/or micro flow sensors. IoT sensors can also include energy modules, power management modules, RF modules, and sensing modules. RF modules manage communications through their signal processing, WiFi, ZigBee®, Bluetooth®, radio transceiver, duplexer, etc.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for a streaming algorithm using analog crossbar architectures (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on a processor for performing matrix sketching, the method comprising:
    placing a first matrix and a second matrix in an analog crossbar architecture;
    low rank updating the first matrix for a first period of time;
    copying the first matrix into a dynamic correction computing device;
    switching to the second matrix to low rank update the second matrix for a second period of time;
    as the second matrix is low rank updated, feeding the first matrix with first stochastic pulses to reset the first matrix back to a first matrix symmetry point;
    copying the second matrix into the dynamic correction computing device;
    switching back to the first matrix to low rank update the first matrix for a third period of time; and
    as the first matrix is low rank updated, feeding the second matrix with second stochastic pulses to reset the second matrix back to a second matrix symmetry point.

2. The method of claim 1, wherein the first and second matrices include streaming data.

3. The method of claim 2, wherein the streaming data is normalized to prevent asymmetry effects.

4. The method of claim 3, wherein the low rank updating of the first and second matrices is scaled to adjust a final sketching matrix to between (−0.1, 0.1) for a full range of (−1, 1) to operate near the first and second matrix asymmetry points.

5. The method of claim 4, wherein once the matrix sketching is applied to an entire input, a final sketching matrix is moved to a digital computer to perform a regression analysis.

6. The method of claim 1, wherein the dynamic correction computing device concurrently corrects the first and second matrices.

7. A non-transitory computer-readable storage medium comprising a computer-readable program executed on a processor in a data processing system for performing matrix sketching, wherein the computer-readable program when executed on the processor causes a computer to perform the steps of:
    placing a first matrix and a second matrix in an analog crossbar architecture;
    low rank updating the first matrix for a first period of time;
    copying the first matrix into a dynamic correction computing device;

switching to the second matrix to low rank update the second matrix for a second period of time;

as the second matrix is low rank updated, feeding the first matrix with first stochastic pulses to reset the first matrix back to a first matrix symmetry point;

copying the second matrix into the dynamic correction computing device;

switching back to the first matrix to low rank update the first matrix for a third period of time; and as the first matrix is low rank updated, feeding the second matrix with second stochastic pulses to reset the second matrix back to a second matrix symmetry point.

8. The non-transitory computer-readable storage medium of claim 7, wherein the first and second matrices include streaming data.

9. The non-transitory computer-readable storage medium of claim 8, wherein the streaming data is normalized to prevent asymmetry effects.

10. The non-transitory computer-readable storage medium of claim 9, wherein the low rank updating of the first and second matrices is scaled to adjust a final sketching matrix to between (−0.1, 0.1) for a full range of (−1, 1) to operate near the first and second matrix asymmetry points.

11. The non-transitory computer-readable storage medium of claim 10, wherein once the matrix sketching is applied to an entire input, a final sketching matrix is moved to a digital computer to perform a regression analysis.

12. The non-transitory computer-readable storage medium of claim 7, wherein the dynamic correction computing device concurrently corrects the first and second matrices.

13. A system for performing matrix sketching, the system comprising:

a memory; and one or more processors in communication with the memory configured to:

place a first matrix and a second matrix in an analog crossbar architecture;

low rank update the first matrix for a first period of time;

copy the first matrix into a dynamic correction computing device;

switch to the second matrix to low rank update the second matrix for a second period of time;

as the second matrix is low rank updated, feed the first matrix with first stochastic pulses to reset the first matrix back to a first matrix symmetry point;

copy the second matrix into the dynamic correction computing device;

switch back to the first matrix to low rank update the first matrix for a third period of time; and as the first matrix is low rank updated, feed the second matrix with second stochastic pulses to reset the second matrix back to a second matrix symmetry point.

14. The system of claim 13, wherein the first and second matrices include streaming data.

15. The system of claim 14, wherein the streaming data is normalized to prevent asymmetry effects.

16. The system of claim 15, wherein the low rank updating of the first and second matrices is scaled to adjust a final sketching matrix to between (−0.1, 0.1) for a full range of (−1, 1) to operate near the first and second matrix asymmetry points.

17. The system of claim 16, wherein once the matrix sketching is applied to an entire input, the final sketching matrix is moved to a digital computer to perform a regression analysis.

18. The system of claim 13, wherein the dynamic correction computing device concurrently corrects the first and second matrices.

19. A computer-implemented method executed on a processor for performing matrix sketching, the method comprising:

applying dimensionality reduction to streaming data using outer product low rank updates;

once the dimensionality reduction is applied to an entire input, moving a sketched matrix to a digital computer to perform regression analysis, wherein the sketched matrix is derived from a first matrix and a second matrix used in parallel in a toggling manner, the first and second matrices placed in an analog crossbar architecture;

low rank updating the first matrix for a first period of time;

copying the first matrix into a dynamic correction computing device; and switching to the second matrix to low rank update the second matrix for a second period of time.

20. The method of claim 19, further comprising:

as the second matrix is low rank updated, feeding the first matrix with first stochastic pulses to reset the first matrix back to a first matrix symmetry point;

copying the second matrix into the dynamic correction computing device;

switching back to the first matrix to tow rank update the first matrix for a third period of time; and as the first matrix is low rank updated, feeding the second matrix with second stochastic pulses to reset the second matrix back to a second matrix symmetry point.

21. A system for performing matrix sketching, the system comprising:

a memory; and one or more processors in communication with the memory configured to:

apply dimensionality reduction to streaming data using outer product low rank updates;

once the dimensionality reduction is applied to an entire input, move a sketched matrix to a digital computer to perform regression analysis, wherein the sketched matrix is derived from a first matrix and a second matrix used in parallel in a toggling manner, the first and second matrices placed in an analog crossbar architecture;

low rank update the first matrix for a first period of time;

copy the first matrix into a dynamic correction computing device; and switch to the second matrix to low rank update the second matrix for a second period of time.

* * * * *